Sept. 7, 1965 R. W. WARREN ETAL 3,204,405
THREE DIMENSIONAL JET VECTORING SYSTEM
Filed Feb. 20, 1964 4 Sheets-Sheet 1

INVENTORS
**ROMALD E. BOWLES
RAYMOND W. WARREN**

Sept. 7, 1965  R. W. WARREN ETAL  3,204,405
THREE DIMENSIONAL JET VECTORING SYSTEM
Filed Feb. 20, 1964  4 Sheets-Sheet 2

INVENTORS
ROMALD E. BOWLES
RAYMOND W. WARREN
BY

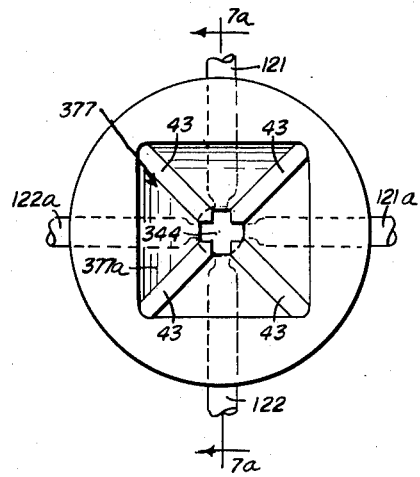
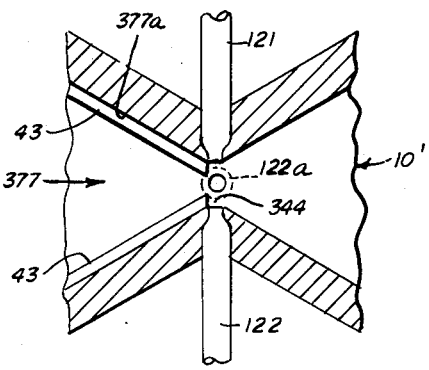
FIG. 7          FIG. 7a
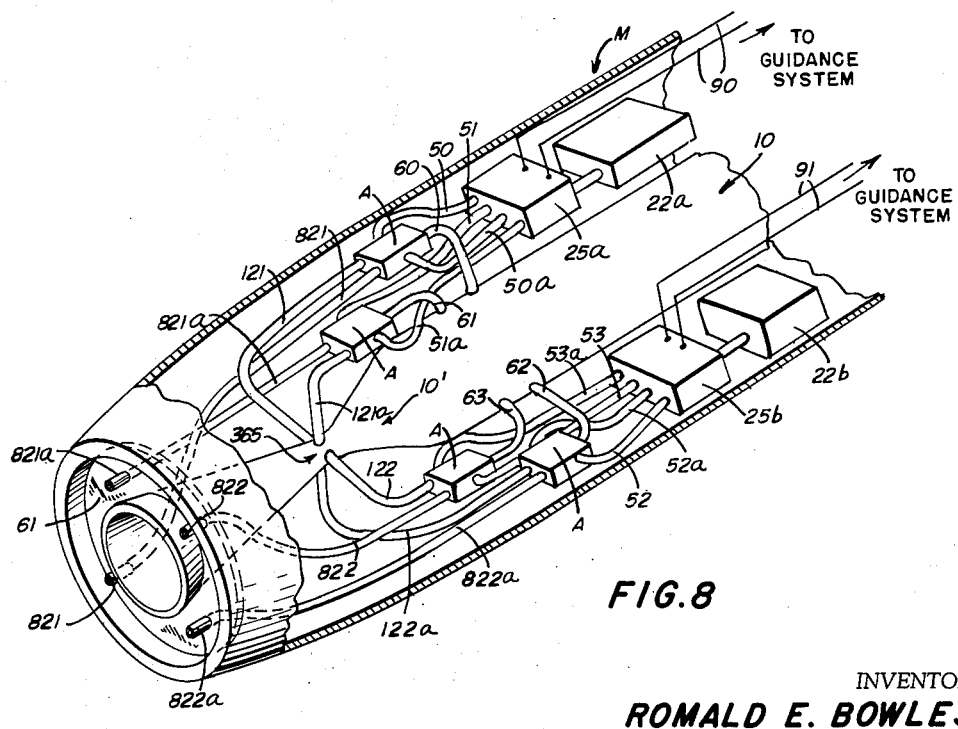
FIG. 8

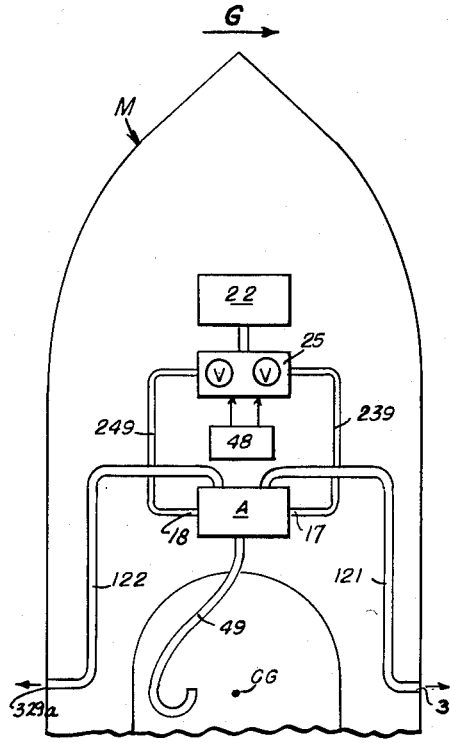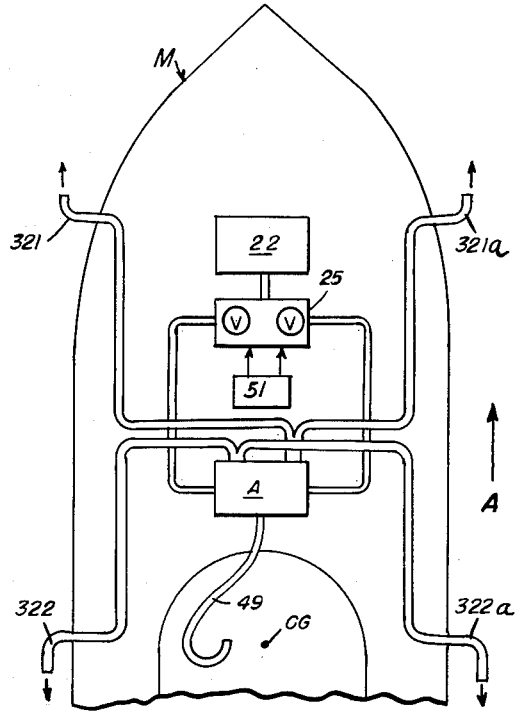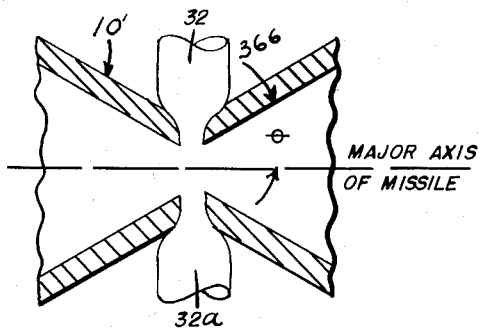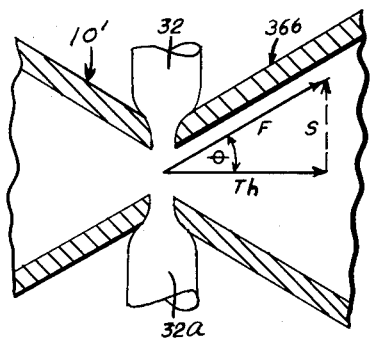

United States Patent Office 3,204,405
Patented Sept. 7, 1965

3,204,405
THREE DIMENSIONAL JET VECTORING SYSTEM
Raymond W. Warren, McLean, Va., and Romald E. Bowles, Silver Spring, Md., assignors to the United States of America as represented by the Secretary of the Army
Filed Feb. 20, 1964, Ser. No. 347,646
5 Claims. (Cl. 60—35.54)
(Granted under Title 35, U.S. Code (1952), sec. 266)

The invention described herein may be manufactured and used by or for the Government for governmental purposes without the payment to us of any royalty thereon.

This application is a continuation-in-part of application Serial No. 108,207 filed May 5, 1961, now abandoned, entitled Three Dimensional Jet Vectoring System, and assigned to the same assignee as the present invention.

This invention relates to a pure fluid control system for controlling the flight of missiles, rockets and reaction propelled vehicles.

Missiles and rockets usually have incorporated therein a system for maintaining the missile on its preselected course during part or all of its flight to the target area. Such a system typically includes a guidance system responsive to variations or deviations from the preselected course or flight pattern and some type of control means, actuated by the guidance system, for physically changing the flight direction of the missile either as a result of reorientation of the missile as an entity, or by redirecting the missile reaction motor exhaust reactor, etc.

Control means with which we are familiar usually utilize ailerons, vanes and the like, which pivot or rotate in response to a signal from the guidance system should the missile deviate from its proper course. These ailerons or vanes interact with either the fluid through which the missile is traveling or interact with the missile propulsion fluid jet. Control means which interact with the missile propulsion jet cause a deflection of this jet from its normal path during a control signal. One disadvantage with such a control means, however, is that it may fail to function properly when subjected to erosion or thermal expansion or jamming of moving parts occurring as a result of entrained solids or as a result of heat generated by normal missile flight and propulsion system operation.

In order to overcome this disadvantage, those skilled in the art have searched for method and means to control missile flight without use of moving vanes or mechanical deflectors. This work has included injection of a secondary fluid within the rocket nozzle to deflect the propulsion jet; however, the reorientation torque resulting from previous techniques has been only slightly greater than that which would have resulted from using the reaction force of direct ejection of the secondary gas flow. In addition, where a hot gas is used as the secondary fluid, previous methods for controlling flow of the secndary fluid have been limited in reliability by the necessity of mechanically valving contaminated hot gas.

One of the most severe limitations of prior art control systems resides in their being unable to successfully valve contaminated hot gases which are produced by the propulsion motor of the rocket. Such valves are generally opened or closed by a control signal from the guidance system and allow gases from the motor to issue from ports eccentric to the missile major axis so that the missile is turned towards its preestablished flight course by gas issuing from these ports. When valves are subjected to gases at extremely high temperatures, expansion in the valve parts in considerable and may cause undesirable "freezing" of the valve during flight of the missile.

It is an important object of the invention therefore to provide a control system which employs a cool gas in the valving stage. The cool gas thereafter controls a stream of hot gas, the hot gas ultimately deflecting the hot propelling jet of the rocket motor in accordance with an error signal received by the valving system.

More specifically, it is an object of this invention to provide a three-stage system which employs only cool gas during the valving stage, uses this cool gas to deflect a hot gas stream during the second stage, and thereafter uses the controlled hot gas stream of the second stage to deflect the hot gases produced by the main propelling jet of the rocket motor.

It is another object of this invention to provide a control system which will produce a reorientation torque greater than that which would result from using the reaction force of direct ejection of the control fluid flow when the control fluid flows in response a command for reorienation of the the missile, the control system having a minimum number of moving elements.

Still another object of this invention is to provide a propulsion nozzle shape such that it behaves as a fluid amplifier having no moving parts and in combination therewith a fluid control system which is capable of controlling in two degrees of freedom, deflection of the jet issuing from the propulsion nozzle as a result of a control signal responsive to deviation of the missile from its preestablished flight path or orientation.

It is a further object of this invention to provide a fluid control system for a missile incorporating a fluid amplifier, the output of which communicates with the throat of a reaction motor nozzle, the throat section of the nozzle so shaped as to provide a second fluid amplifier so that a fluid control signal supplied to the amplifier by the guidance system is again amplified sufficiently to deflect the thrust vector of the jet issuing from the motor nozzle.

Another object of this invention is to provide a system having a minimum number of moving parts which in response to a deviation in missile orientation with respect to the missile velocity vector provides an error signal, amplifies said error signal and controls discharge of one or more fluid streams, the reactive force of said fluid streams providing a corrective torque which results in reduction of said error signal.

An additional object of this invention is to provide a system having a minimum number of moving parts which in response to missile deviation from the desired flight path amplifies the error signal provided by a guidance or command system and controls discharge of one or more fluid streams where the reaction force of said fluid streams provide a corrective force which results in reduction of said deviation from the desired flight path with or without intermediate missile reorientation.

A still further object of this invention is to provide a system having a minimum number of moving parts, which, in response to missile deviation from the desired flight speed amplifies the error signal provided by a command or guidance system and controls discharge of one or more fluid streams having a resultant reactive force parallel to the missile major axis. The discharge is normally parallel to the direction of missile flight, so that the sense and effect of such fluid discharge provides a corrective force which results in reduction of said deviation from the missile desired flight speed.

Another object of this invention is to provide a system having a minimum number of moving parts which in response to error signals provided by a guidance system uses the amplified fluid error signals to control discharge of one or more fluid streams; the reactive force of said fluid stream providing a corrective acceleration which results in reduction of said deviation.

The specific nature of the invention, as well as other objects, uses, and advantages thereof, will clearly appear from the following description and from the accompanying drawing, in which:

FIG. 4a is a side sectional view of FIG. 4 taken through section lines 4a—4a.

FIG. 6a is a sectional side view of FIG. 6, taken through section lines 6a—6a.

FIG. 7 is another modification of a reaction motor nozzle constructed in accordance with this invention.

FIG. 7a is a sectional side view of the reaction motor nozzle illustrated in FIG. 7, taken through section lines 7a—7a.

FIG. 8 illustrates a stream interaction type of reaction nozzle and two pairs of fluid amplifiers for use therewith.

FIG. 9 is another embodiment of a fluid control system responsive to changes in missile displacement error and which issues a jet pattern to counteract such changes.

FIG. 10 is still another embodiment of a fluid control system which responds to counteract missile velocity magnitude or speed error.

FIGS. 11 and 12 are partial section views of a reaction nozzle and an interaction section and includes a vector diagram of the reaction forces present within the interaction section.

Figure 1:
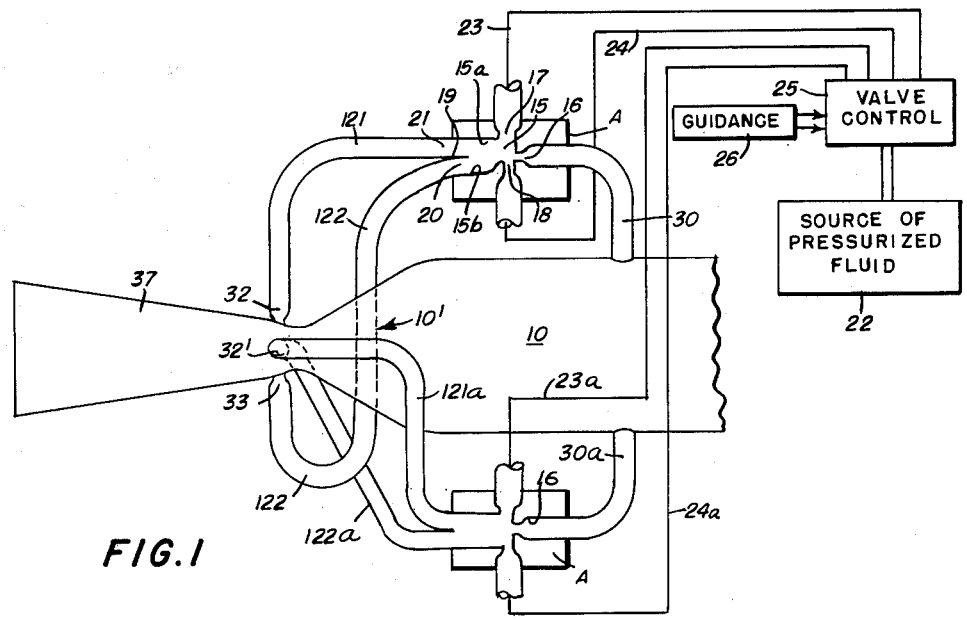
FIGS. 1, 1a and 1b illustrate a typical connection between a fluid amplifier of the boundary layer control type and a reaction motor nozzle modified in accordance with this invention, and in addition the sectional views shown in FIGS. 1a and 1b illustrate separation of the propulsion stream from the nozzle walls during operation of the combination.

According to this invention a portion of the hot propulsion fluid furnished by a reaction propulsion motor is supplied to one or more fluid amplifiers. A signal from the guidance system valves a cool fluid stream. The valved cool fluid stream enters the fluid amplifier and deflects the hot gases supplied to the amplifiers from the reaction motor. The hot gases leaving the fluid amplifiers are supplied to the propulsion nozzle of the reaction motor. The propulsion nozzle has a chamber which is designed as a fluid amplifier so that an amplified deflection of the hot propulsion jet stream is effected by this gas. Deflection of the hot propelling jet stream will cause a change in the propulsion thrust vector which changes the direction of the flight of the missile.

In a stream interaction amplifier a power nozzle is supplied pressurized fluid and issues a power jet or main stream. A control jet is directed against the side of the power jet and deflects the power jet away from the control jet. If there is no splash or bounce of the fluid streams, momentum is conserved and the power jet will flow at an angle with respect to its original direction wherein the tangent of this angle is a function of the momentum of the control stream and the original momentum of the power jet. Thus it is possible to direct a high power jet to a target area or receiving tube system using a lower power control stream. This constitutes an amplifier in the conventional sense of the term. Control streams of the same total pressure level can be given different weighting or levels of effectiveness by providing the control stream nozzles with suitable relative cross-sectional areas.

In the boundary layer control type of fluid amplifier a high energy power jet is directed towards a target area or receiving tube systems by the pressure distribution in the power jet boundary layer region. This pressure distribution is controlled by the wall configuration of the interaction chamber, the power jet energy level, the fluid transport characteristics, the backloading of the amplifier outputs, and the flow of control fluid to the power jet boundary layer region. Whereas side walls are not essential for a stream interaction type fluid amplifier, a boundary layer control fluid amplifier generally uses the side walls for deflection of the power jet. In a boundary layer control fluid amplifier special design of the interaction chamber configuration permits designs wherein the power jet will lock onto one side wall and remain in the lock-on flow configuration without a control fluid flow. When the power jet is suitably deflected by a control fluid flow it can be directed to lock-on to the opposite side wall and remain in the new lock-on flow configuration even after the control fluid flow is stopped.

The fluid amplifiers described above control the delivery of energy of a main stream of fluid to an outlet orifice or utilization device by means of control fluid flow issuing from a control nozzle generally at right angles to the main stream. The proportion of the relatively high energy main stream delivered to an orifice may be varied as a linear or non-linear function of the relatively low energy of a control stream interacting therewith. Since the energy controlled is larger than the control energy supplied, an energy gain is realized and amplification in the conventional sense is effected. Such amplifiers require no moving parts other than the fluid flow therein and consequently have a frequency response considerably higher than prior art fluid systems which employ moving parts.

Both types of fluid amplifiers are disclosed in detail on pages 15 and 19 in the April 1960 edition of "Automatic Control," published by Reinhold Publishing Company.

In the figures in general, like elements performing the same or similar functions are referred to by like numerals and letters.

Referring now to FIG. 1, for a more complete understanding of the invention, there is shown one embodiment of a fluid amplifier A, for deflecting the thrust jet of a reaction propulsion motor 10. Motor nozzle 10' is formed in motor 10. Amplifier A is formed by chamber 15, fluid power nozzle 16, a pair of opposed control nozzles 17 and 18, fluid flow divider 19 and apertures 20 and 21.

Amplifier A is preferably of the boundary layer control type in which case the bottoms of the chamber walls are set back from either side of the orifice formed by power nozzle 16 a limited amount. Because the chamber walls 15a and 15b are set back from the orifice of the power nozzle, when fluid issues from power nozzle 16 a region of fluid moving at a significantly lower speed than the main stream is created along the chamber walls. This region along either wall 15a or 15b is known by those in the art as an artificial boundary layer region. If control fluid flow is introduced from some suitable source, such as control nozzle 17 or 18, into this region between the main fluid stream and the closest chamber wall, the effect will be to raise the pressure in the boundary layer region and reduce or nullify the lock-on effect produced thereby. The control fluid flow will deflect the main fluid stream towards that chamber wall which is opposite the wall which the fluid initially locked onto. This feature provides controlled switching of the main fluid stream from one output aperture 20 to the other output aperture 21.

Amplifier A may also be of the stream interaction type described above and shown in FIG. 2 of the drawings. In this type of fluid amplifier amplification is effected because a fluid stream from control nozzle 17 or 18 having a relatively small amount of energy interacts with and deflects a main fluid stream from power nozzle 16 having considerable energy so that the main fluid stream can be directed to deliver its energy in whole or in part to a desired aperture, or location, or aperture combination. In such a case, the walls of chamber 15 can be remote from the fluid stream issuing from the supply nozzle 16, because the side wall pressure distribution is not essential for operation of this type of fluid amplifier.

The amplifiers may take the form of three clear plastic plates laminated together, the middle plate only being cut or etched in the desired configuration.

As shown in FIG. 1, two identical amplifiers A are provided so that the combination of four output tubes, 121, 122, 121a and 122a, can effect deflection in two degrees of freedom of the propelling jet produced by rocket motor 10.

Control nozzles 17 and 18 of each amplifier A receive cool control fluid from a source of pressurized fluid 22 through control valve system 25. This source of pressurized fluid may be a tank of pressurized nitrogen or any other suitable cool fluid. Tubes 23, 24, 23a and 24a connect source 22 to a control valve system 25. Valve system 25 is designed to regulate the relative quantities of cool fluid which flows from source 22 into tubes 23, 24, 23a and 24a, respectively, in response to a signal from guidance system 26. Such guidance systems and valve controls are well known to those skilled in the art.

Valve 25 may comprise a pair of pistons in a balance valve which are actuated by solenoids receiving electrical signals from the guidance system. Movement of the pistons allows more fluid to enter one control nozzle than the other. U.S. Patents Nos. 1,418,792, 2,414,103 and 2,670,158, are examples of combinations of guidance systems and balance valves which can be used to vary the proportion or quantity of fluid received by control nozzles 17 and 18 from source 22.

In order to overcome the problem of valving hot gases it is preferable to supply cool fluid to the valve control 25. As will be evident, the cool fluid can control deflection of hot gases received from the reaction motor in the second stage, that is, in the amplifiers A. The hot gases from the amplifier output tubes can deflect even hotter contaminated gases of the propelling jet as the third and last stage in deflecting the propelling jet, as will be hereafter evident.

Figure 3:
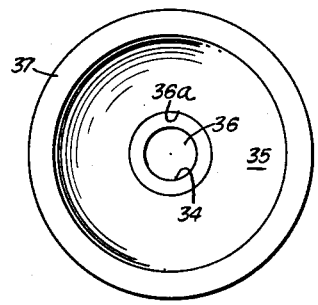
FIG. 3 is an end view of the reaction motor nozzle of the boundary layer type as shown in FIG. 1, with the control nozzles removed for purposes of clarity.

Tubes 30 and 30a connect the power nozzles 16 to the chamber of motor 10, as shown. A portion of propulsion fluid furnished by the motor 10 can thus be fed to each amplifier A. Filters may be used to filter out contaminants from the gas. Motor nozzle 10', converges to form a constricted orifice 34 leading to interaction section 36, and thereafter diverges at walls 35 to form the remaining section 37 of the nozzle 10'. Interaction section 36 is formed in the shape of a boundary layer control type amplifier (FIG. 1a) since the ends of diverging walls 36a are setback from orifice 34. As should be evident, interaction section 36 is similar in shape to interaction chamber 15 of amplifier A. An end view of interaction section 36 is shown in FIG. 3.

Figure 1A:
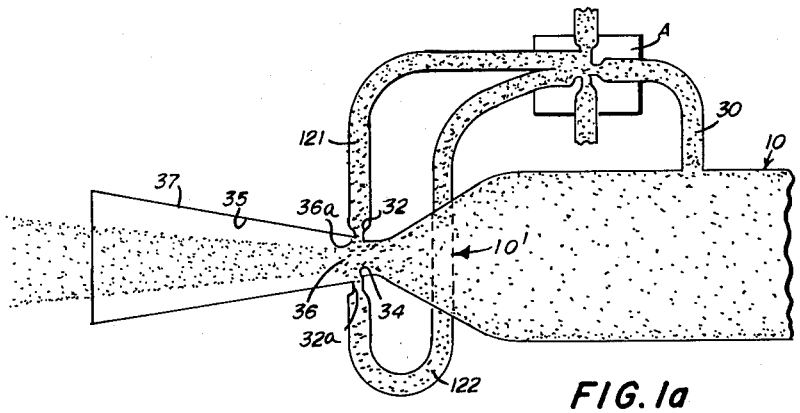
Figure 1B:
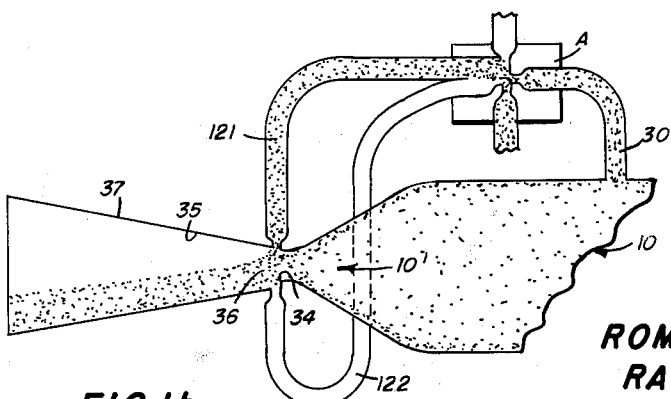

The effect of fluid issuing from four nozzle-shaped ends (only three being shown and enumerated by numerals 32, 33 and 32' in FIG. 1) on the propelling jet flowing through orifice 34 is amplified in the same manner and for the reasons that fluid issuing from control nozzles 17 and 18 in amplifier A produces an amplified displacement of the fluid stream flowing through chamber 15. Since the jets from output tubes 121, 122, 121' and 122' are respectively opposed, the propelling jet can be deflected to any position in interaction section 36 because the direction of the thrust vector of the propelling jet will be the resultant of the thrust vectors produced by fluid issuing from any one or all of the outputs tubes. Thus, as shown in FIG. 1a, should opposite output tubes 121 and 122 issue equal quantities of fluid, the propelling jet will be centered in section 36, whereas should one tube, as for example tube 121, issue a greater quantity of fluid (FIG. 1b) the propelling jet will be deflected to an opposite wall of the throat.

Since the flow of fluid issuing from amplifiers A is again amplified in the nozzle 10', double amplification is obtained and therefore only a relatively small quantity of cool fluid from source 22 is able to deflect a large quantity of the propelling fluid. Also, this control system requires a minimum number of moving parts, such moving parts being solely in valve system 25 and in guidance system 26.

Examples of some other configurations and shapes which the interaction section 36 may assume and still provide and amplifying function are shown in FIGS. 4, 5, 6 and 7.

Figure 4:
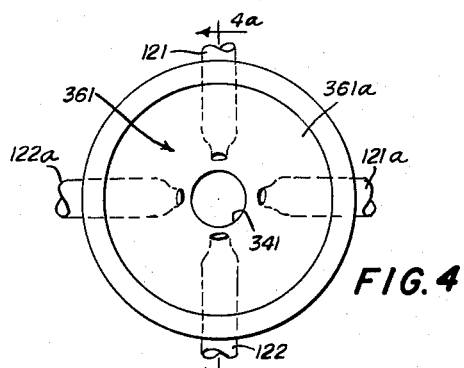
FIG. 4 is an end view of a reaction motor nozzle of the type wherein boundary layer separation is not triggered by setback but rather by rapid nozzle sidewall divergence or slope and where the control nozzles are located just downstream of the sharp divergence of nozzle sidewalls which causes separation.
Figure 4A:
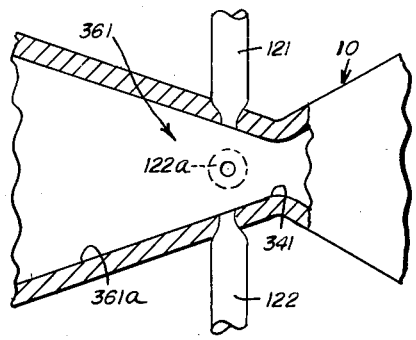
Figure 5:
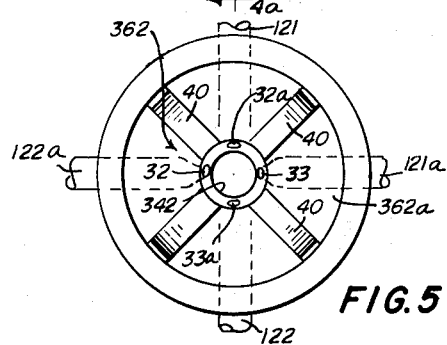
FIG. 5 is an end view of the reaction motor nozzle of FIG. 1, and in addition shows the relative positions of the boundary layer separation vanes and control nozzles, the vanes limiting boundary layer flow which is not in a plane including the reaction motor nozzle major axis.

FIGS. 4 and 5, like FIG. 3, are end views of different type interaction sections with the input tubes added for purposes of clarity. FIG. 4 differs from FIG. 3 in that the latter figure illustrates a reaction motor nozzle having an interaction section 361 wherein separation is not triggered by setback but by the slope of walls 361a. Fluid is supplied to this section by orifice 341 formed by the converging walls of nozzle 10'.

FIG. 5 is an end view of an interaction section 362 which includes four vanes 40 which are equi-spaced and secured to the inside of walls 362a forming interaction section 362. Walls 40 isolate the separate boundary provided by section 362. Fluid is introduced into section 362 by means of nozzles 32, 33, 32' and 33' formed by the ends of tubes 121, 122, 121a and 122a, respectively. Tubes 121, 122, 121a and 122a are of course the output tubes from amplifiers A. Preferably the nozzles 32, 33, 32' and 33' communicate exactly between each pair of vanes 40 so provided. Vanes 40 define four possible flow paths for the fluid issuing from orifice 342 and prevent undesirable cross feeding or rotational effects which might be created by fluid issuing from nozzles 32, 33, 32' and 33'.

Figure 6A:
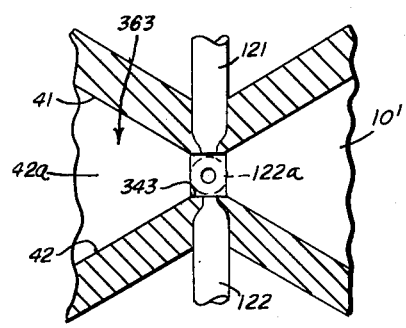
Figure 6:
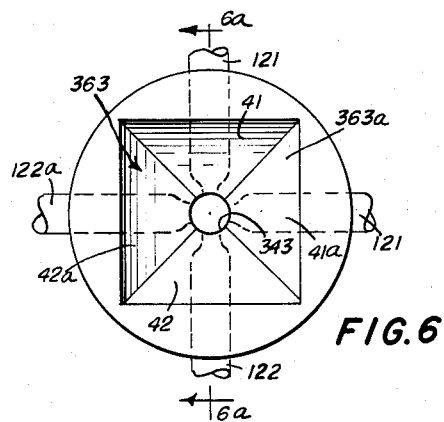
FIG. 6 illustrates a modification of the nozzle throat section shown in FIG. 3, and in addition shows the position of control nozzles.

FIGS. 6 and 6a illustrate another possible interaction section design, referred to by numeral 363. As shown in these figures the diverging walls 363a forming section 363 are in the approximate shape of an open-ended truncated pyramid. Interaction section 363 is of the stream interaction type because walls 343 are not setback. The propelling fluid from the motor 10 can be deflected against any of the four diverging walls 41, 41a, 42 and 42a, respectively, by fluid from tubes 121, 121a, 122 and 122a. Section 363 may also utilize boundary layer by merely providing set back to walls 343.

FIGS. 7 and 7a, like FIGS. 6 and 6a, illustrate another embodiment of a motor nozzle of open ended truncated pyramid shape which employs vanes 43 in interaction section 377 to insure against undesirable cross feeding effects of the control signals issuing from control nozzles 45, 45a, 46 and 46a. Tubes 121, 121a, 122 and 122a respectively, convey fluid to these nozzles. This embodiment, like that shown in FIGS. 6 and 6a utilizes stream interaction control to effect amplification since walls 377a are not setback from orifice 344 (FIG. 7a). While diverging walls 377a have been illustrated as surfaces generated by straight lines they will in many cases be contoured surfaces shaped in accordance with fluid dynamic design considerations, so as to provide an exhaust jet which is composed of non-diverging streams of fluid.

FIG. 8 illustrates a possible control system for a propulsion motor 10' in a missile M. The control system shown in this figure is utilizing fluid amplifiers and the amplifier construction of the jet interaction chamber similar to the control system illustrated in FIGS. 1, 1a and 1b, but requires two pairs of identical amplifiers A for control of the propelling jet in two degrees of freedom. Two conventional control valve systems 25a and 25b similar to valve system 25 described above, are designed to feed variable quantities of fluid into tubes 50, 50a, 51, 51a, 52, 52a, 53 and 53a. Leads 90 and 91 connect the solenoids, for example, which actuate balance valves in system 25 to an error signal source (not shown). The amount of fluid received by each tube from sources 22a and 22b will depend upon the input error signal which the control valve receives. The error signal source or guidance system (not shown) may be any type of conventional system which produces an output signal in response to missile deviation from a preselected course.

In this figure, motor nozzle 10' is shaped as a fluid amplifier of the stream interaction type.

Error signals received by the control valve systems 25a and 25b will selectively open or close the valves in the valve systems so as to cause cool fluid to flow into one pair of tubes 50, 50a, 51, 51a, 52, 53 and 53a from sources 22a and 22b. The quantity of fluid received by these tubes will depend upon the duration of the signal from the guidance system, as will be evident. Fluid received by these tubes will in turn control the deflection of the hot fluid entering the amplifiers A to which they are connected. Fluid can be received by the amplifiers A from reaction motor 10 by means of input tubes 60, 61, 62 and 63. As shown in the figure, each amplifier is provided with a pair of output tubes 121, 821; 121a 821a; 122, 822; 122a and 822a. The ends of tubes 821, 821a, 822 and 822a are secured in plate 61 and arranged concentrically to motor nozzle 10'.

Figure 2:
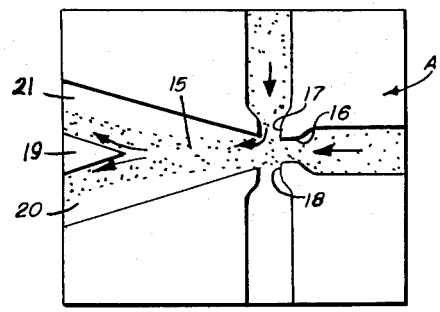
FIG. 2 is a plan view of a typical fluid amplifier of the stream interaction type.

In this embodiment, amplifiers A are preferably of the stream-interaction type, as illustrated in detail by FIG. 2. Control fluid flow from tube pairs 50, 50a; 51, 51a; 52, 52a; 53 and 53a will thusly cause proportional displacement within each amplifier A of fluid received from tubes 60, 61, 62 and 63. Therefore, should a signal from the guidance system cause more fluid to enter tube 50, for example, than enters tube 50a, deflection of the fluid from tube 60 into output tube 821 will occur. Fluid deflected into tube 821 ultimately issues therefrom and creates a reaction which will turn the missile about its center of gravity. A smaller proportion of fluid will also be entering output tube 121 because of lesser fluid flow from tube 50a, and this smaller quantity of fluid from tube 121 will cause less deflection of the propelling jet towards the opposite wall of the interaction section 365. Accordingly, a greater portion of fluid will be flowing along the interaction wall opposite tube 122 and the combined effect of the decrease in deflection of the propelling jet by less fluid issuing from tube 121 and the greater turning effect provided by a greater proportion of fluid issuing from tube 821 will cooperate to achieve angular displacement of the missile about its center of gravity until the guidance system senses that the missile is again on its preestablished course. At that time each output tube will again be supplied with an equal quantity or proportion of fluid from the amplifiers A.

The fluid issuing from the output tubes 821, 821a, 822 and 822a aids in propelling the missile M as well as aiding the turning of the missile when the amplifiers with which these tubes are connected receive a fluid control signal from the valve systems 25a or 25b. In the absence of a control signal from valve systems 25a and 25b, amplifiers A will all be issuing equal quantities of fluid into each output tube connected to each amplifier so that the propelling jet will be centrally or symmetrically flowing from nozzle 10'.

It will be evident that interaction section 365 may either take the form of a stream interaction amplifier section or of a boundary layer control type of interaction section.

FIGS. 9 and 10 illustrate other possible fluid control systems for use in missile M. In the embodiment shown in FIG. 9, tube 49 communicating with rocket motor 10, receives a small portion of the propelling fluid generated by motor 10 and conveys fluid so received into amplifier A. Also connected to amplifier A is a conventional valve control system 25, such as described above, from which a pair of tubes 239 and 249 extend to communicate with the control nozzles 17 and 18 of the amplifier A. Amplifier A may either be of the stream-interaction type or the boundary-layer type disclosed above. Numeral 48 designates an altitude-responsive switch which may take the form of a conventional barometric switch which actuates the control system 25 when the switch senses a differential barometric pressure from a preestablished standard.

Output tubes 121 and 122 curve back from amplifier A to a point opposite the center of gravity of missile M, the ends of these tubes being flush with the skin of missile M. Nozzles 329 and 329a, which may be expansion nozzles, direct fluid from the amplifier outwardly of the missile, as shown by the arrows in FIG. 9.

Should missile M be displaced in the direction of arrow G, for example, and obtain an altitude for which the barometric switch 48 is pre-set, switch 48 will energize valve control 25 so that fluid will flow from source 22 into tube 249 deflecting the fluid stream in amplifier A into tube 121 whence it can issue from nozzle 329 to oppose dropping of missile M in that direction. Conversely, should missile M rise too far, switch 48 sensing a decrease in barometric pressure, will properly energize valve control 25 so that tube 239 receives fluid from source 22 deflecting the fluid flow in amplifier A into tube 122. Since the extremities of tubes 121 and 122 are aligned opposite the center of gravity of missile M no torque is caused by fluid issuing from these tubes. Fluid so issuing from tube 122 will tend to counteract missile rise.

FIG. 10 illustrates another embodiment which employs a portion of the propelling jet as the means to prevent variation of the missile travel from a preestablished speed program. In this embodiment numeral 51 designates a speed-responsive programmer which, can energize valve control system 25 as a result of deviation in missile speed from a predetermined standard established in the programmer. Tubes 121 and 122 are forked to provide tubes pairs 321, 321a; 322 and 322a, respectively. Tubes 321 and 321a are positioned to retard the speed of missile M in the direction indicated by arrow A when fluid issues from these tubes, whereas tubes 322 and 322a are positioned to increase the speed of travel of the missile when the fluid issues from the latter tubes. The ends of the tubes may be nozzle-shaped, if desired.

Should missile M experience a decrease in speed in the direction of arrow A, nozzle 322 and 322a will issue fluid as a consequence of programmer 51 sensing the speed decrease and opening a valve in system 25 associated with tube 230. Source 22 thereby feeds more fluid into control tube 230 causing more fluid to be deflected into, and issue from tube 122. Fluid flowing through tube 122 will split equally at the fork to flow in equal quantities from tubes 322 and 322a. Conversely, if the missile should increase in speed, speed-responsive switch 51 sensing the speed increase will close the valve associated with tube 230 and open the valve associated with control tube 240. Thus fluid in amplifier A will be deflected into tubes 321 and 321a. Fluid issuing from these tubes will tend to decrease the speed of missile M. The angular position relative to the missile axis of nozzles 321, 321a, 322 and 322a in this embodiment is not critical, as will be apparent.

As shown in FIGS. 9 and 10, once the propelling jet is deflected into one or the other of the amplifier apertures, subsequent vectoring of the fluid flow through any angle can be accomplished by the curvilineal configuration tubes. Thus, the post deflection vectoring of the propelling fluid stream is effected with a minimum of control fluid energy and consequently the volume of the source of pressurized fluid can be minimized.

In order to provide most efficient deflection of the fluid stream in the rocket nozzle 10', the angle between the opposed diverging walls of the interaction chamber should be 45 degrees. FIG. 11 shows partial sectional view of a nozzle and an interaction section 366. The deflection angle, that is the angle between the opposed diverging walls of the interaction section against which the main fluid stream can be deflected is designated $\theta$. Referring now to FIG. 12, the propelling jet reaction provides a resultant force (F) which has components (Th) parallel to the missile major axis and (S) normal to the missile major axis. When the force vector (F) is deflected from "zero position," that is, the position where the thrust is parallel to the missile major axis, through an angle ($\theta$) to a new angular position the value of (Th) drops from $Th=F$ to $Th=F \cos \theta$. The side component (S) simultaneously increases from $S=0$ to $S=F \sin \theta$. The effectiveness (e) of the interaction section will be $$e = \frac{(Th)+(S)}{(F)} = \sin \theta + \cos \theta$$

This effectiveness is a maximum when $$de/d\theta = \cos \theta - \sin \theta = 0$$

i.e., when $$\theta = \pm 45°$$

Ordinarily of (Th) and (S) are developed by each of two separate nozzles at right angles to each other each nozzle requires a flow capable of delivering one thrust unit. A single propelling jet deflected to 45° on the other hand would develop the same thrust components totalling two thrust units with a total fluid flow of but 1.414 thrust units.

Therefore, if the walls are sloped to exhaust at 45° with respect to the missile major axis maximum control effectiveness will be realized. Similarly, when the chamber walls of the amplifiers A are at 45° with respect to a longitudinal axis through the power nozzle maximum control effectiveness by the control nozzles will be achieved.

In addition, it will be evident to those skilled in the art that reactive forces produced by fluid issuing from amplifier A may be used in all types and kinds of aircraft to pivot elements such as the ailerons, or to cause movement of the wings of such aircraft.

The control fluid may consist of a liquid such as hydrogen peroxide having a catalyst capable of producing an exothermic reaction after valving and prior to injection into the interaction chamber. If the propelling jet consists of any type hydrocarbon conventionally used in reaction motors as, for example, alcohol, then the control fluid may be any conventional oxidizing fluid such as liquid oxygen.

One of the foremost advantages of providing a boundary layer type of design in the reaction motor nozzle is that a continuous jet of control fluid is not required to maintain the deflection of the propelling jet. A single fluid pulse or a jet issuing from one of the control nozzles will cause the propelling jet to lock-on and remain locked-on to the throat wall in the absence of another fluid pulse from another control nozzle. This feature achieves continuous deflection of the propelling jet by pulsed fluid sources of short duration, and thus continuous control fluid streams are not required to maintain a proper deflection of the propelling jet.

It is also contemplated that the walls of the reaction nozzle may diverge at a substantial angle whereby the jet detaches itself from all walls simultaneously. In such case flow of the propelling jet will be symmetrically exhausted as for example, as shown in FIG. 12. When a control fluid is supplied through one wall to the separated boundary layer the pressure distribution of this boundary layer causes deflection of the propelling jet away from the control fluid input. The propelling jet will thereupon cling to the opposite wall until the control signal is discontinued at which time it will return to the center flow position. Thus a tristable flow pattern can also be provided by two diametrically opposed low level control pulses or signals.

Most important however is the fact that the above disclosed system eliminates the need for valving hot gases in order to control deflection of the propelling jet of the motor and also achieves two stage amplification of the control signal from the guidance system.

It will be apparent that the embodiments shown are only exemplary and that various modifications can be made in construction and arrangement within the scope of the invention as defined in the appended claims.

We claim as our invention:

1. A three dimensional jet vectoring system to guide vehicles propelled by a rocket motor, said rocket motor including a jet forming thrust nozzle which converges to form a constricted orifice leading to an interaction region and thereafter diverges to form the exhaust for the reaction products generated in the combustion chamber of said rocket motor, said jet forming thrust nozzle being symmetrical about its longitudinal axis and the diverging portion thereof expanding at a rate sufficient to permit a thrust jet formed by the converging portion thereof and issued from said orifice to exhaust through said diverging portion substantially free of the wall of said diverging portion, said jet vectoring system comprising:
   (a) pure fluid amplifier means for issuing a controlled hot gas stream, said pure fluid amplifier means including:
      (1) a fluid power nozzle connected to the combustion chamber of said rocket motor and issuing a power jet of hot gas generated by the combustion reaction in said combustion chamber,
      (2) a fluid control nozzle positioned to issue a fluid control jet against the side of said power jet and to thereby cause said power jet to deflect, and
      (3) an output tube positioned to receive a greater or lesser amount of said power jet depending on the deflection thereof by said fluid control jet,
   (b) a source of cool fluid under pressure,
   (c) valve control means responsive to guidance signals for valving fluid in said source of cool fluid to said fluid control nozzle, and
   (d) a thrust control nozzle positioned in said interaction region of said jet forming thrust nozzle to issue a thrust control jet against the side of said thrust jet, said thrust control nozzle being connected to said output tube in said pure fluid amplifier means.

2. A three dimensional jet vectoring system to guide vehicles propelled by a rocket motor, said rocket motor including a jet forming thrust nozzle which converges to form a constricted orifice and thereafter diverges to form the exhaust for the reaction products generated in the combustion chamber of said rocket motor, said jet forming thrust nozzle being symmetrical about its longitudinal axis and the diverging portion thereof expanding at a rate sufficient to permit a thrust jet formed by the converging portion thereof and issued from said orifice to exhaust through said diverging portion substantially free of the wall of said diverging portion, said diverging portion of said jet forming thrust nozzle being divided into four equal quadrants by longitudinally disposed vanes, said vanes being of sufficient thickness to prevent lateral cross entrainment thereby defining distinct interaction regions, said jet vectoring system comprising:
   (a) pure fluid amplifier means for issuing controlled hot gas streams, said pure fluid amplifier means including:
      (1) a fluid power nozzle connected to the combustion chamber of said rocket motor and issuing a power jet of hot gas generated by the combustion reaction in said combustion chamber,
(2) a plurality of fluid control nozzles positioned to issue fluid control jets against the side of said power jet and to thereby cause said power jet to deflect, and
(3) a plurality of output tubes positioned to receive a greater or lesser amount of said power jet depending on the deflection thereof by said fluid control jets, (b) a source of cool fluid under pressure,
(c) valve control means responsive to guidance signals for valving fluid in said source of cool fluid to said fluid control nozzles, and
(d) a thrust control nozzle positioned in each of said interaction regions of said jet forming thrust nozzle to issue thrust control jets against the side of said thrust jet, said thrust control nozzles being connected to said output tubes in said pure fluid amplifier means.

3. A three dimensional jet vectoring system to guide vehicles propelled by a rocket motor, said rocket motor including a jet forming thrust nozzle which converges to form a constricted orifice leading to an interaction region and thereafter diverges to form the exhaust for the reaction products generated in the combustion chamber of said rocket motor, said jet forming thrust nozzle being symmetrical about its longitudinal axis and the diverging portion thereof expanding at a rate sufficient to permit a thrust jet formed by the converging portion thereof and issued from said orifice to exhaust through said diverging portion substantially free of the wall of said diverging portion, said jet vectoring system comprising:

(a) first and second pure fluid amplifier means for issuing controlled hot gas streams, said first and second pure fluid amplifier means each including:
(1) a fluid power nozzle connected to the combustion chamber of said rocket motor and issuing a power jet of hot gas generated by the combustion reaction in said combustion chamber,
(2) a pair of opposing fluid control nozzles positioned to issue fluid control jets against the side of said power jet and to thereby cause said power jet to deflect, and
(3) a pair of output tubes positioned to receive a greater or lesser amount of said power jet depending on the deflection thereof by said fluid control jets, (b) a source of cool fluid under pressure,
(c) valve control means responsive to guidance signals for valving fluid in said source of cool fluid to said fluid control nozzles in each of said first and second fluid amplifier means, and
(d) two pairs of opposing thrust control nozzles located at right angles to each other and positioned in said interaction region of said jet forming thrust nozzle to issue thrust control jets against the side of said thrust jet, one of said pairs of thrust control nozzles being connected to the output tubes of said first pure fluid amplifer means and the other of said pairs of thrust control nozzles being connected to the output tubes of said second pure fluid amplifier means.

4. A three dimensional jet vectoring system to guide vehicles propelled by a rocket motor, said rocket motor including a jet forming thrust nozzle which converges to form a constricted orifice and thereafter diverges to form the exhaust for the reaction products generated in the combustion chamber of said rocket motor, said jet forming thrust nozzle being symmetrical about its longitudinal axis and the diverging portion thereof expanding at a rate sufficient to permit a thrust jet formed by the converging portion thereof and issued from said orifice to exhaust through said diverging portion substantially free of the wall of said diverging portion, said diverging portion of jet forming thrust nozzle being divided into four equal quadrants by longitudinally disposed vanes, said vanes being of sufficient thickness to prevent lateral cross entrainment thereby defining distinct interaction regions, said jet vectoring system comprising:

(a) first and second pure fluid amplifier means for issuing controlled hot gas streams, said first and second pure fluid amplifier means each including:
(1) a fluid power nozzle connected to the combustion chamber of said rocket motor and issuing a power jet of hot gas generated by the combustion reaction in said combustion chamber,
(2) a pair of opposing fluid control nozzles positioned to issue fluid control jets against the side of said power jet and to thereby cause said power jet to deflect, and
(3) a pair of output tubes positioned to receive a greater or lesser amount of said power jet depending on the deflection thereof by said fluid control jets, (b) a source of cool fluid under pressure,
(c) valve control means responsive to guidance signals for valving fluid in said source of cool fluid to said fluid control nozzles in each of said first and second fluid amplifier means, and
(d) a thrust control nozzle positioned in each of said interaction regions of said jet forming thrust nozzle to issue thrust control jets against the side of said thrust jet, the opposing thrust control nozzles positioned in the interaction regions corresponding to the first and third quadrants of said diverging portion of said jet forming thrust nozzle as defined by said longitudinally disposed vanes being connected to the output tubes of said first pure fluid amplifier means and the opposing thrust control nozzles positioned in the interaction regions corresponding to the second and fourth quadrants being connected to the output tubes of said second pure fluid amplifier means.

5. A three dimensional jet vectoring system to guide vehicles propelled by a rocket motor, said rocket motor including a jet forming thrust nozzle which converges to form a constricted orifice leading to an interaction region and thereafter diverges to form the exhaust for the reaction products generated in the combustion chamber of said rocket motor, said jet forming thrust nozzle being symmetrical about its longitudinal axis and the diverging portion thereof expanding at a rate sufficient to permit a thrust jet formed by the converging portion thereof and issued from said orifice to exhaust through said diverging portion substantially free of the wall of said diverging portion, said jet vectoring system comprising:

(a) first, second, third, and fourth pure fluid amplifier means for issuing controlled hot gas streams, said first, second, third, and fourth pure fluid amplifier means each including:
(1) a fluid power nozzle connected to the combustion chamber of said rocket motor and issuing a power jet of hot gas generated by the combustion reaction in said combustion chamber,
(2) a pair of opposing fluid control nozzles positioned to issue fluid control jets against the side of said fluid power jet and to thereby cause said power jet to deflect, and
(3) a pair of output tubes positioned to receive a greater or lesser amount of said power jet depending on the deflection thereof by said fluid control jets, (b) a source of cool fluid under pressure,
(c) valve control means responsive to guidance signals for valving fluid in said source of cool fluid to said fluid control nozzles in each of said first, second, third, and fourth fluid amplifier means, (d) two pairs of opposing thrust control nozzles located at right angles to each other and positioned in said interaction region to issue thrust control jets against the side of said thrust jet, one of said thrust control nozzles in the first of said pairs being connected to one output tube of said first pure fluid amplifier means, the other of said thrust control nozzles in the first of said pairs being connected to one output tube of said third pure fluid amplifier means, one of said thrust control nozzles in the second of said pairs being connected to one output tube of said second pure fluid amplifier means, the other of said thrust control nozzles in the second of said pairs being connected to one output tube of said fourth pure fluid amplifier means, and the other output tubes of said first, second, third, and fourth fluid amplifier means being arranged concentrically to said jet forming thrust nozzle and positioned to issue fluid in substantially the same direction as said thrust jet.

References Cited by the Examiner

UNITED STATES PATENTS

| | | | |
|---|---|---|---|
| 2,916,873 | 12/59 | Walker | 60—35.54 |
| 2,943,821 | 7/60 | Wetherbee | 60—35.54 X |
| 3,036,430 | 5/62 | Eggers et al. | 60—35.54 |
| 3,122,165 | 2/64 | Horton. | |
| 3,144,037 | 8/64 | Cargill et al. | 137—81.5 |

FOREIGN PATENTS 1,130,132   9/56   France.

OTHER REFERENCES

Control Engineering, May 1960, pages 26, 28, 30.
Science and Mechanics, June 1960, volume 31, No. 3, pages 81, 84.

SAMUEL LEVINE, *Primary Examiner.*